United States Patent [19]

Nagino

[11] Patent Number: 5,598,870
[45] Date of Patent: Feb. 4, 1997

[54] FUEL TANK DEVICE FOR VEHICLE HAVING FLOAT VALVE AND DIAPHRAGM VALVE

[75] Inventor: Yoshihiro Nagino, Inazawa, Japan

[73] Assignee: Toyoda Gosei Co., Ltd., Aichi-ken, Japan

[21] Appl. No.: 545,933

[22] Filed: Oct. 20, 1995

[30] Foreign Application Priority Data

Nov. 1, 1994 [JP] Japan ................................ 6-293831
Nov. 1, 1994 [JP] Japan ................................ 6-293832

[51] Int. Cl.⁶ .......................... F02M 25/08; F16K 17/36
[52] U.S. Cl. ........................ 137/587; 123/518; 137/202
[58] Field of Search ............................ 123/516, 518; 137/587, 202

[56] References Cited

U.S. PATENT DOCUMENTS

| | | | |
|---|---|---|---|
| 4,953,583 | 9/1990 | Szlaga | 137/587 |
| 4,982,757 | 1/1991 | Ohasi et al. | 137/202 |
| 5,054,508 | 10/1991 | Benjey | 137/587 |
| 5,065,782 | 11/1991 | Szlaga | 137/202 |
| 5,082,016 | 1/1992 | Nakamura | 137/202 |
| 5,156,178 | 10/1992 | Harris | 137/587 |
| 5,172,714 | 12/1992 | Kobayashi et al. | 137/202 |
| 5,234,013 | 8/1993 | Roetker et al. | 137/587 |
| 5,234,022 | 8/1993 | Harris | 137/587 |
| 5,261,439 | 11/1993 | Harris | 137/587 |
| 5,313,977 | 5/1994 | Bergsma et al. | 137/202 |
| 5,402,818 | 4/1995 | Kasugai et al. | 137/587 |
| 5,409,030 | 4/1995 | Sung | 137/202 |
| 5,417,240 | 5/1995 | Benjey | 137/587 |
| 5,449,029 | 9/1995 | Harris | 137/202 |
| 5,474,048 | 12/1995 | Yamazaki et al. | 137/587 |
| 5,497,800 | 3/1996 | Ohashi et al. | 137/587 |

FOREIGN PATENT DOCUMENTS 56-113039  9/1981  Japan.
60-184779  9/1985  Japan.
63-30495   6/1988  Japan.
4-39061    9/1992  Japan.
5-185850   7/1993  Japan.

*Primary Examiner*—Thomas N. Moulis
*Attorney, Agent, or Firm*—Cushman Darby & Cushman IP Group of Pillsbury Madison & Sutro LLP

[57] ABSTRACT

A fuel tank device for a vehicle having a fuel tank, the device including a float valve mounted within the fuel tank, and a diaphragm valve connected to an air outflow passage of the float valve. The float valve includes a casing, and a float received in a float chamber in the casing for vertical movement for opening and closing the air outflow passage in a top wall of the casing in accordance with a change of a fuel liquid level in the fuel tank. The casing includes a removable bottom portion having a through hole. The diaphragm valve includes (a) a reference pressure chamber, (b) a fluid pressure chamber in communication with the air outflow chamber, (c) a fluid outflow passage provided at the fluid pressure chamber, (d) a fluid discharge chamber in communication with the fluid outflow passage, (e) an annular outer extension chamber connected to an outer periphery of the fluid discharge chamber, the outer extension chamber being greater in height than the flat fluid discharge chamber, (f) a fluid discharge passage connected to the outer extension chamber, and having an inner diameter generally equal to the height of the outer extension chamber, (g) a diaphragm separating the reference pressure chamber from the fluid pressure chamber, the diaphragm receiving a pressure of a fluid within the fluid pressure chamber for communicating the fluid pressure chamber with the fluid outflow passage, and (h) structure for urging the diaphragm into a position to interrupt the communication between the fluid pressure chamber and the fluid outflow passage.

7 Claims, 6 Drawing Sheets

FUEL TANK DEVICE FOR VEHICLE HAVING FLOAT VALVE AND DIAPHRAGM VALVE

The priority applications, Japanese Application No. 06-293831, filed in Japan on Nov. 1, 1994 and Japanese Patent Application No. 06-293832, filed in Japan on Nov. 1, 1994 are hereby incorporated into the present specification by this reference.

BACKGROUND OF THE INVENTION

This invention relates to a fuel tank device for a vehicle which is mounted on an upper portion of a fuel tank, and includes a float valve for discharging fuel vapor from the interior of the fuel tank to the exterior thereof during refueling and for limiting the flow of fuel out of the fuel tank when the fuel tank is filled with the fuel, and a diaphragm valve for feeding the outflow fuel vapor into a canister.

Conventional float valves of the type described are disclosed, for example, in Japanese Patent Unexamined Publication No. 5-185850 and Japanese Utility Model Examined Publication No. 4-39061, and such a float valve has a construction as shown in FIG. 10.

This float valve 100 comprises a cylindrical casing 102 with a closed bottom, which is formed by a top wall 102a, a side or peripheral wall 102b and a bottom wall 102c, a float 110 received in a float chamber 104 formed in the casing 102, a valve portion 110a formed on an upper surface of the float 110 for closing an air outflow passage 111, and a compression coil spring 114 provided between a lower surface of the float 110 and the bottom wall 102c. Through holes 118 and 118b for flowing the air and fuel vapor therethrough into the float chamber 104 are formed through the side wall 102a and the bottom wall 102c of the casing 102, respectively.

In the float valve 100 of this construction, during the supply of fuel into a fuel tank FT, the air and fuel vapor flows from the fuel tank FT to the exterior thereof by flowing through the through hole 118 in the casing 102, into the float chamber 104 and out through the air outflow passage 111. Then, when the fuel within the fuel tank FT reaches a full liquid level FL, the fuel flows into the float chamber 104 through the through hole 118b to impart buoyancy to the float 110, thereby floating the float 110. The float 110 thus rises, so that the valve portion 110a, formed on the upper surface of the float 110, closes the air outflow passage 111, thereby preventing the fuel from flowing out from the fuel tank FT.

In the above float valve 100, however, the full liquid level FL, which determines the timing of closing of the air outflow passage 111 by the valve portion 110a as a result of rising of the float 110, is predetermined, that is, set to a constant level, by a resilient force of the compression coil spring 114 of the float valve 100, the weight of the float 110 and the buoyancy produced by the float 110. Various kinds of fuel tanks FT have particular full liquid levels, and therefore the design of the float valve 100 must be changed in accordance with the full liquid level of each fuel tank. This is disadvantageous and costly.

A conventional diaphragm valve of the type described is disclosed, for example, in Japanese Patent Unexamined Publication No. 60-184779, and is used to protect a fuel tank against the increase of a vapor pressure within the fuel tank. This diaphragm valve will now be described with reference to FIG. 11. In FIG. 11, the diaphragm valve 200 includes a housing 202 whose internal space serves as a valve chamber 204. This valve chamber 204 is divided into a reference pressure chamber 206 and a fluid pressure chamber 208 by a diaphragm 210. An urging force of a compression coil spring 212 and the atmospheric pressure within the reference pressure chamber 206 are applied to one side or face of the diaphragm 210 while the pressure within the fluid pressure chamber 208 (which is created by the pressure of the fuel vapor fed into the fluid pressure chamber 208 through an inflow passage 214) is applied to the other side of the diaphragm 210. The forces acting respectively on the opposite sides of the diaphragm 210 are balanced with each other. Thus, when the diaphragm 210 moves out of engagement with a seat portion 216, the fuel vapor within the fuel tank flows to a canister (not shown) through the inflow passage 214, through an outflow passage 218 and through a discharge passage 222 in a discharge conduit 220.

In order to increase the flow rate in the diaphragm valve 200, it is necessary to increase the flow passage areas of the inflow passage 214, the outflow passage 218 and the discharge passage 222. If the flow passage area of the outflow passage 218 and the discharge passage 222 is narrowed midway therethrough, the vapor pressure, flowing through these passages 218 and 222, acts in a valve-opening direction, so that the opening and closing of the diaphragm 210 becomes unstable. Therefore, to avoid such unstable operation, the flow passage area of the discharge passage 222 needs to be large.

However, if the diameter of the discharge conduit 220 is increased in order to increase the flow passage area of the discharge passage 222, the height of the diaphragm valve 200 increases, which has resulted in a problem that the fuel tank device can not be easily mounted on a vehicle.

SUMMARY OF THE INVENTION

It is a first object of this invention to provide a fuel tank device which includes a float valve capable of easily changing a full liquid level of a fuel tank, and a diaphragm valve which has a compact construction even if a discharge passage is increased in diameter.

A second object of the invention is to provide a float valve for a fuel tank which is capable of easily changing a full liquid level of a fuel tank.

A third object of the invention is to provide a diaphragm valve for a fuel tank which has a compact construction even if a discharge passage is increased in diameter.

According to a first aspect of the present invention, there is provided a fuel tank device for a vehicle having a fuel tank. The device includes a float valve constructed and arranged to be mounted within the fuel tank at an upper portion of the fuel tank and a diaphragm valve connected to an air outflow passage of the float valve.

The float valve comprises (i) a casing having a float chamber therein, the casing including a top wall having the air outflow passage therethrough, a side wall extending downwardly from the top wall, and a bottom portion removably mounted on a lower end portion of the side wall, and the bottom portion having a through hole, and (ii) a float received in the float chamber for vertical movement therein, the float having a valve portion for opening and closing the air outflow passage in accordance with a change of a fuel liquid level within the fuel tank.

The diaphragm valve includes (a) a reference pressure chamber maintained at a predetermined pressure, (b) a fluid pressure chamber in communication with the air outflow chamber, (c) a fluid outflow passage provided at a generally central portion of the fluid pressure chamber, (d) a fluid discharge chamber in communication with the fluid outflow passage, (e) an annular outer extension chamber connected to an outer periphery of the fluid discharge chamber, the outer extension chamber having a height greater than a height of the fluid discharge chamber, (f) a fluid discharge passage connected to the outer extension chamber, the fluid discharge passage having an inner diameter generally equal to the height of the outer extension chamber, (g) a diaphragm separating the reference pressure chamber from the fluid pressure chamber, the diaphragm receiving a pressure of a fluid within the fluid pressure chamber for communicating the fluid pressure chamber with the fluid outflow passage, and (h) urging means for urging the diaphragm into a position to interrupt the communication between the fluid pressure chamber and the fluid outflow passage.

According to a second aspect of the invention, there is provided a float valve for a fuel tank comprising:

a casing having a float chamber therein, the casing including a top wall having an air outflow passage therethrough, a side wall extending downwardly from the top wall, and a bottom portion removably mounted on a lower end portion of the side wall, and the bottom portion having a through hole; and a float received in the float chamber for vertical movement, the float having a valve portion for opening and closing the air outflow passage in accordance with a change of a fuel liquid level within the fuel tank.

According to a third object of the invention, there is provided a diaphragm valve for a fuel tank comprising:

a reference pressure chamber constructed and arranged to be maintained at a predetermined pressure;

a fluid pressure chamber in communication with an air outflow chamber of the fuel tank;

a fluid outflow passage provided at a generally central portion of the fluid pressure chamber;

a fluid discharge chamber in communication with the fluid outflow passage;

an annular outer extension chamber connected to an outer periphery of the fluid discharge chamber, the outer extension chamber having a height greater than a height of the fluid discharge chamber;

a fluid discharge passage connected to the outer extension chamber, the fluid discharge passage having an inner diameter generally equal to the height of the outer extension chamber;

a diaphragm separating the reference pressure chamber from the fluid pressure chamber, the diaphragm receiving a pressure of a fluid within the fluid pressure chamber for communicating the fluid pressure chamber with the fluid outflow passage; and urging means for urging the diaphragm into a position to interrupt the communication between the fluid pressure chamber and the fluid outflow passage.

In the float valve of the present invention, during refueling, the air and fuel vapor within the fuel tank flows to the exterior thereof via the through hole in the bottom plate (bottom portion) of the casing, through the float chamber and through the air outflow passage. Then, the fuel tank becomes full of the fuel, and because of the difference between the pressure within the fuel tank and the pressure within the float chamber, the fuel flows into the float chamber through the through hole in the bottom plate to impart buoyancy to the float. As a result, the float rises to cause the valve portion on the upper end of the float to close the air outflow passage, thereby preventing the fuel from flowing out of the fuel tank when the fuel tank is full of the fuel.

The timing of rising of the float to cause the valve portion to close the air outflow passage is determined by the position of the through hole through which the fuel flows into the float chamber. This through hole is formed through the bottom plate, and this bottom plate is removably attached to the side wall of the casing. Therefore, by exchanging the bottom plate with another bottom plate having a through hole provided at a different height position, the full liquid level of the fuel tank 2 can be changed.

In the diaphragm valve of the present invention, the pressure within the fluid pressure chamber is increased by the fuel vapor fed through the air outflow chamber, and when this pressure exceeds a predetermined pressure within the reference pressure chamber, the diaphragm is brought out of engagement with a seat portion to open the air outflow passage. As a result, the air outflow passage communicates with the fluid discharge passage via the fluid pressure chamber, the fluid discharge passage, the fluid discharge chamber and the outer extension chamber.

In such a construction, if the area of the flow passage from the fluid flow passage to the fluid discharge passage via the fluid discharge chamber and the outer extension chamber is narrowed midway therethrough, a force tending to prevent the closing of the diaphragm valve acts on the diaphragm, so that the opening and closing of the diaphragm becomes unstable. However, in the present invention, the height of the outer extension chamber connected to the outer periphery of the fluid discharge chamber is greater than the height of this fluid discharge chamber, and further, this outer extension chamber is extended up to the upper side of the reference pressure chamber, and connects the relatively thin fluid discharge chamber to the fluid discharge passage of a larger diameter without narrowing the flow passage area. Therefore, even if the fluid discharge passage is increased in diameter, the diaphragm valve can be of a compact construction without increasing the thickness thereof.

DESCRIPTION OF THE PREFERRED EMBODIMENTS

Figure 1:
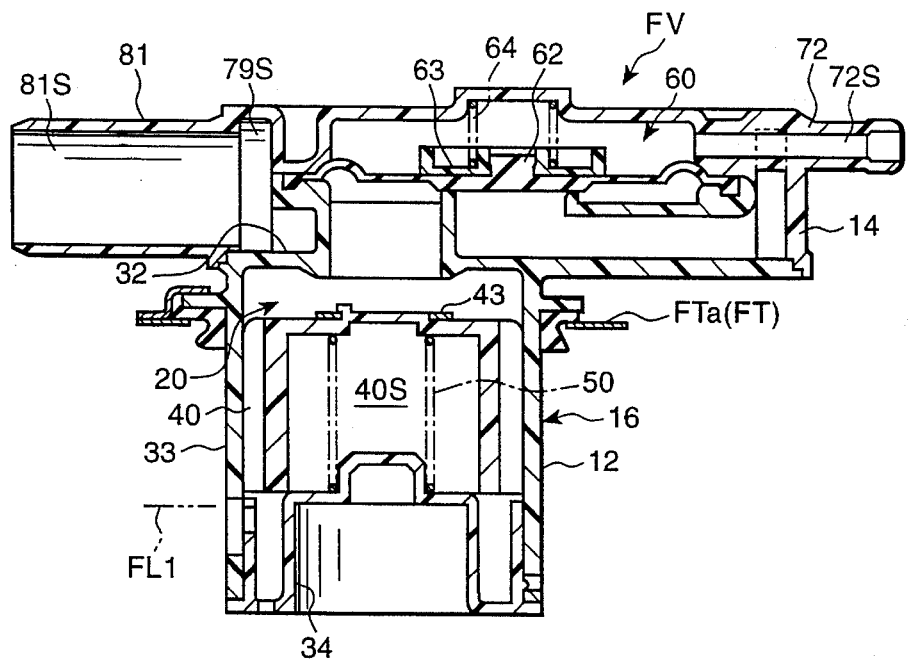
FIG. 1 is a cross-sectional view of a fuel tank device for a vehicle provided in accordance with the present invention.

Referring to FIG. 1, a fuel tank device FV for a vehicle is mounted on an upper portion of a fuel tank FT, and comprises a casing 16 composed of a lower casing member 12 and an upper casing member 14 fixedly connected to an upper portion of the lower casing member 12, a float valve 20, and a diaphragm valve 60 connected to a canister (not shown). The float valve 20 and the diaphragm valve 60 are mounted within the casing 16.

The float valve 20 limits the flow of fuel out of the fuel tank FT when the fuel within the fuel tank FT rises to a predetermined full liquid level FL during refueling. The diaphragm valve 60 discharges fuel vapor from the interior of the fuel tank FT to the canister when the fuel vapor pressure within the fuel tank FT exceeds a predetermined level.

Figure 2:
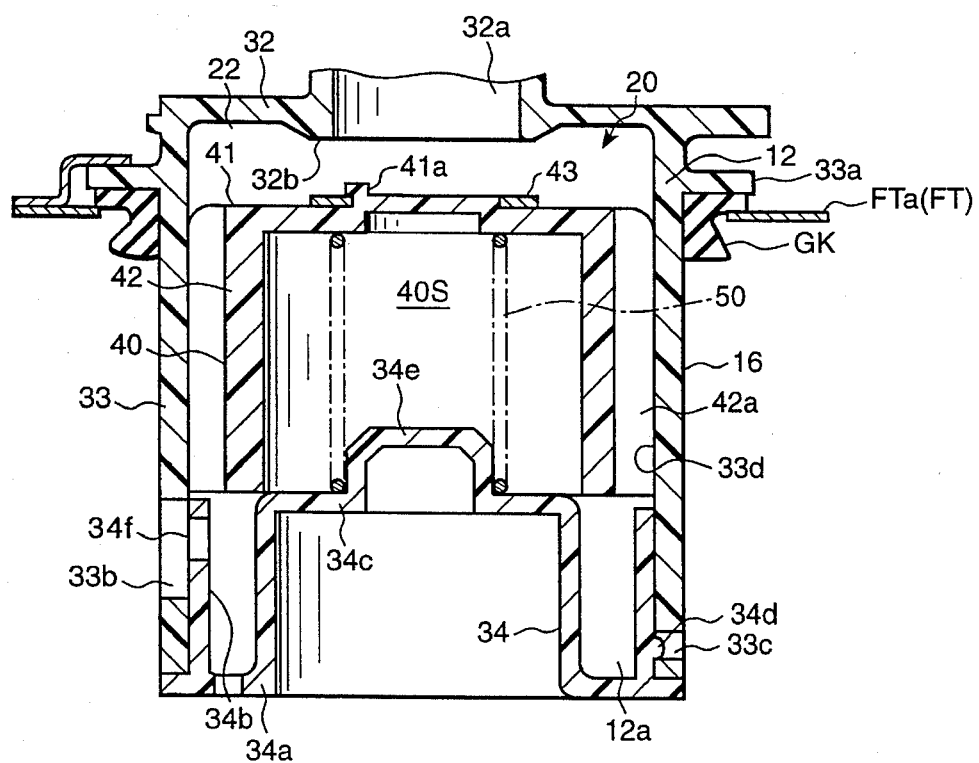
FIG. 2 is a cross-sectional view showing a float valve of the fuel tank device of the invention.

Reference is first made to the float valve 20. As shown in FIG. 2, the float valve 20 is mounted on an upper wall FTa of the fuel tank FT, and comprises as main components, a float 40 mounted within a float chamber 22 in the lower casing member 12, and a coil spring 50 for assisting in a valve-closing operation of the float 40.

The lower casing member 12 is made of a fuel-resistant synthetic resin, and includes a top wall 32 forming part of the diaphragm valve 60, a side or peripheral wall 33 of a cylindrical shape extending downwardly from the top wall 32, and a bottom plate 34 removably mounted on a lower end portion of the side wall 33 to close a lower open end 12a of the lower casing member 12.

An air outflow passage 32a is formed through a central portion of the top wall 32, and is in communication with the diaphragm valve 60, and a peripheral edge of an inlet end of the air inflow passage 32a defines a seat surface 32b.

The side wall 33 has a flange 33a formed at its upper end portion, and the lower casing member 12 is mounted on the fuel tank FT by this flange 33a supported on the fuel tank FT through a gasket GK. An outer through hole 33b (see FIGS. 3 and 5) of a rectangular shape is formed through a lower end portion of the side wall 33, and an engaging through hole 33c for holding the bottom plate 34 is formed through the lower end portion of the side wall 33, and is disposed at a level lower than the through hole 33b. A plurality of vertically-extending, elongate guide projections 33d for guiding the movement of the float 40 are formed on the inner peripheral surface of the side wall 33. A narrow hole 349 for discharging the fuel collected in an internal space in the bottom plate 34 is formed through an outer peripheral bottom portion 34a of the bottom plate 34.

The bottom plate 34 is of an integral construction, and includes the outer peripheral bottom portion 34a, a cylindrical upstanding wall 34b extending upwardly from an outer peripheral portion of the outer peripheral bottom portion 34a to be fitted in the side wall 33, and a cylindrical base portion 34c extending upwardly from an inner peripheral edge of the outer peripheral bottom portion 34a. An engaging projection 34d is formed on the upstanding wall 34b, and is engaged in the engaging through hole 33c in the side wall 33 to hold the bottom plate 34 on the bottom portion of the side wall 22. A spring support portion 34e is formed on a central portion of an upper end of the base portion 34c. The coil spring 50 is supported between the spring support portion 34e and a lower or inner surface of a top wall 41 of the float 40.

Figure 3:
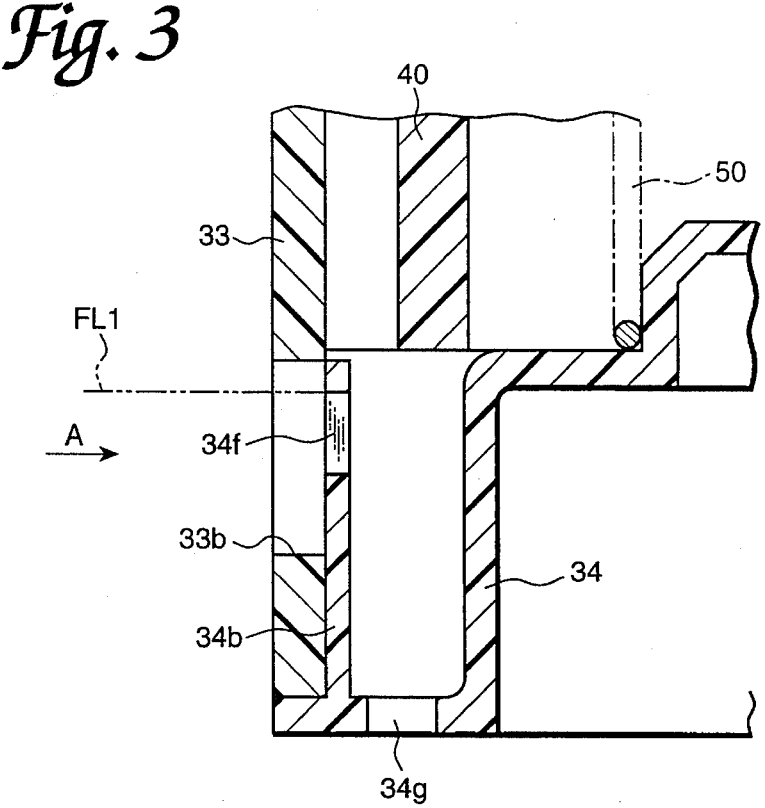
FIG. 3 is an enlarged, cross-sectional view of a lower portion of the float valve of FIG. 2.
Figure 5:
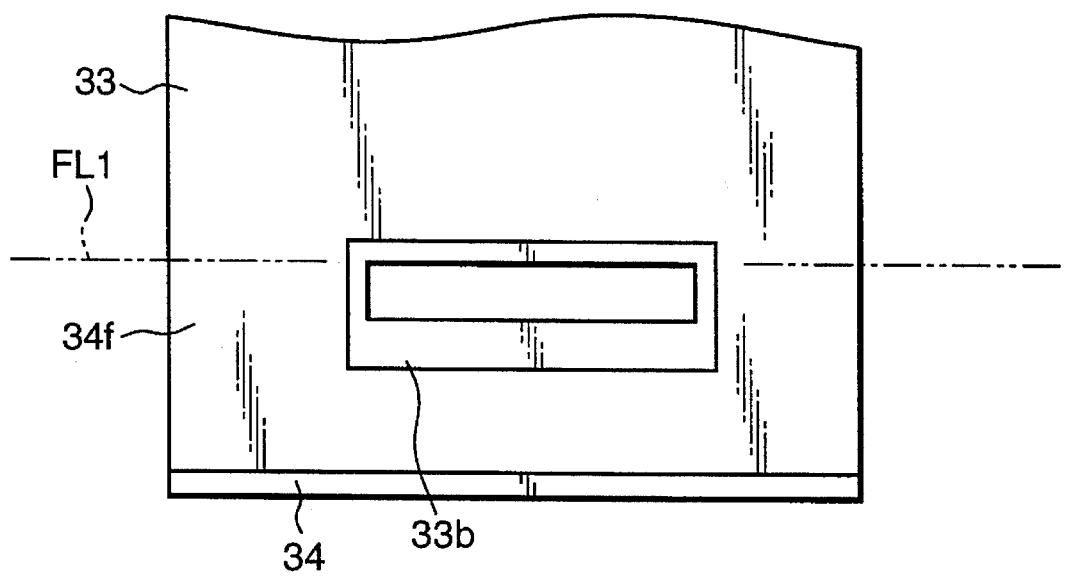
FIG. 5 is a view as seen from arrow A of FIG. 3.

As best shown in FIGS. 3 and 5, an inner through hole 34f is formed through an upper portion of the upstanding wall 34b of the bottom plate 34, and is disposed in registry with an upper portion of the outer through hole 33b in the side wall 33. Therefore, the fuel tank FT communicates with the float chamber 22 through the outer and inner through holes 33b and 34f.

In FIG. 2, the float 40 has a container-like configuration, and includes the top wall 41, and a tubular side wall 42 extending downwardly from an outer peripheral edge of the top wall 41, and an internal space of the float 40 serves as a buoyancy chamber 40S for imparting buoyancy. The float 40 is supported by the coil spring 50 in such a manner that a lower end thereof is disposed at a level above the inner through hole 34f in the bottom plate 34.

An annular step portion 41a is formed on the float top wall 41, and a seal ring 43 is mounted on an outer periphery of the annular step portion 41a. The seal ring 43 is brought into and out of engagement with the seat surface 32b, formed on the peripheral edge of the lower end of the air outflow passage 32a, to close and open the air outflow passage 32a. In view of a sealing property and a fuel-resistant property, the seal ring 43 is made of a rubber material such as fluoro-rubber and nitrile rubber. Vertically-extending, elongate guide projections 42 are formed on an outer peripheral Surface of the float side wall 42, and these elongate guide projections 42 are engaged with the elongate guide projections 33d, formed on the inner peripheral surface of the side wall 33, to guide the upward and downward movement of the float 40.

The operation of the float valve 20 will now be described. The fuel is supplied into the fuel tank FT for refueling purposes, and when the pressure of fuel vapor collected at an upper portion of the interior of the fuel tank FT reaches a predetermined level, this fuel vapor flows through the outer through hole 33b in the side wall 33 of the casing 16, the inner through hole 34f in the bottom plate 34, a space between the side wall 33 and the side wall 42 of the float 40, and the air outflow passage 32a, and then opens the diaphragm valve 60, and further flows to the canister.

When the fuel is further supplied into the fuel tank FT in a small amount even after the fuel in the fuel tank FT reaches a full liquid level FL1, the volume of vapor in the internal space of the fuel tank FT disposed above the liquid level is compressed by the fuel, and hence the pressure increases. Because of the difference between this increased pressure and the pressure within the float chamber 22, the fuel flows into the float chamber 22 through the outer through hole 33b in the side wall 33 and the inner through hole 34f in the bottom plate 34. As a result, buoyancy is imparted to the float 40 to move the same upwardly, so that the seal ring 43 closes the air outflow passage 32a, thereby preventing the fuel from flowing toward the canister.

As described above, in the float valve 20, the float 40 is supported by the coil spring 50 in such a manner that the lower end of the float 40 is disposed at a level above the inner through hole 34f in the bottom plate 34, and therefore even if the velocity of flow of the fuel vapor into the float chamber 22 through the inner through hole 34f is high, sufficient buoyancy to raise the float 40 is not produced. The float 40 is caused to rise to close the float valve 20 only after the fuel flows into the float chamber 22.

Thus, the full tank level FL1, which determines the timing of closing the float valve 20, is determined by the position of the inner through hole 34f through which the fuel flows from the fuel tank FT into the float chamber 22. Therefore, by changing the position or level of the inner through hole 34f, the full liquid level FL1 can be changed.

Figure 4:
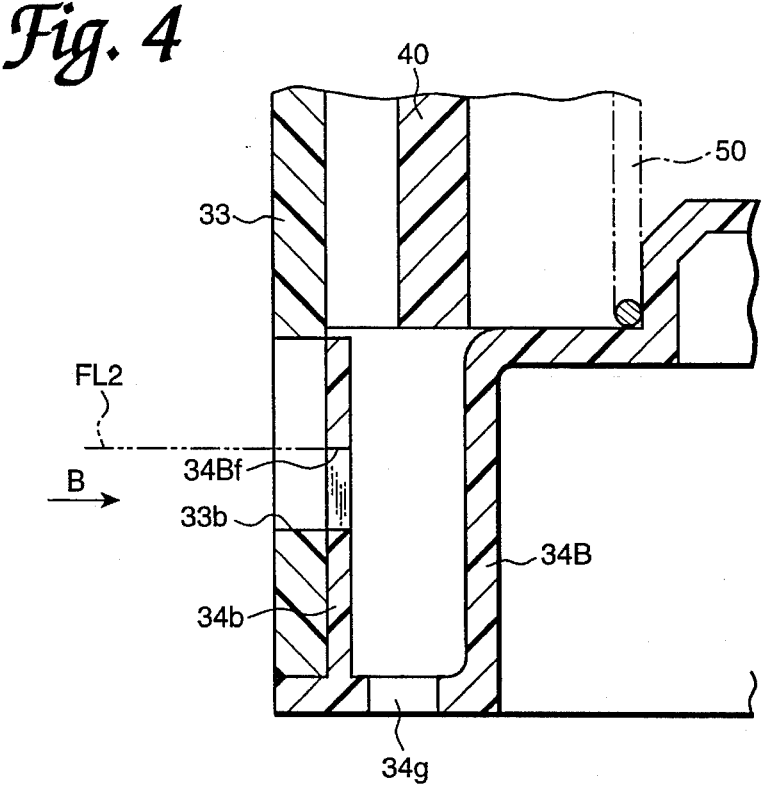
FIG. 4 is a view similar to FIG. 3, but showing a portion of a modified float valve of the invention.
Figure 6:
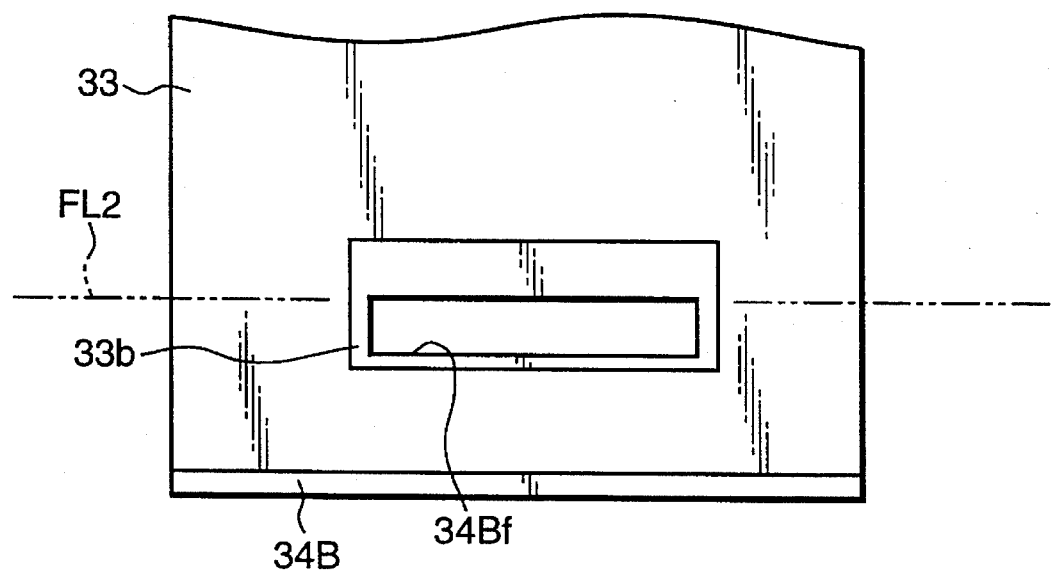
FIG. 6 is a view as seen from arrow B of FIG. 4.

Therefore, a float valve 20 having a different full liquid level can be provided by using a bottom plate 34B shown in FIGS. 4 and 6. More specifically, an inner through hole 34Bf formed through the bottom plate 34B is disposed in registry with a lower portion of the outer through hole 33b in the side wall 33, and is disposed at a level below the inner through hole 34f in the bottom plate 34 (FIG. 3), and its full liquid level is indicated by FL2. The bottom plate 34B has the same construction as that of the bottom plate 34 (FIG. 3) except for the position of the inner through hole 34Bf, and can be easily replaced by the bottom plate 34.

Therefore, there are prepared a plurality of bottom plates 34B having respective inner through holes 34Bf whose height positions are different from one another, and a suitable one of them is selected. By doing so, the full liquid level of the fuel tank FT can be changed, and various kinds of fuel tanks FT can be used without the need for changing the design thereof.

The bottom plates 34 and 34B are simple in construction, and therefore from the viewpoint of the cost, it is more advantageous to determine the full liquid level by exchanging the bottom plate than by exchanging the casing 16 itself.

Figure 7:
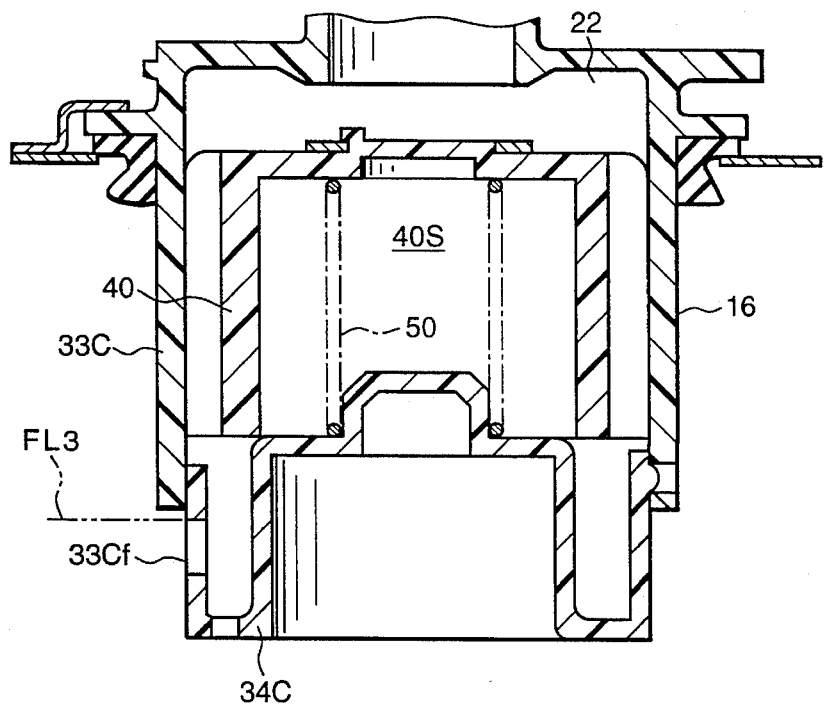
FIG. 7 is a cross-sectional view of another modified float valve of the invention.

Although the bottom plate 34 has the above-mentioned configuration, it may have any other suitable configuration in so far as a float chamber 22 is formed therein, and also the bottom plate can be removably attached to the casing 16. For example, a bottom plate 34C projecting downwardly from a lower end of a side wall 33C, as shown in FIG. 7 can be used. In this case, there is no need to form a through hole through the side wall 33C, and a full liquid level FL3 is determined by the position of a through hole 34Cf.

The through hole does not always need to be formed through the side wall of the bottom plate, and may be formed through a bottom wall of the bottom plate. In this case, a through hole of a large diameter, also serving as an air vent hole, is formed, and by changing the height or level of the bottom plate, the position of the through hole can be changed.

Figure 9:
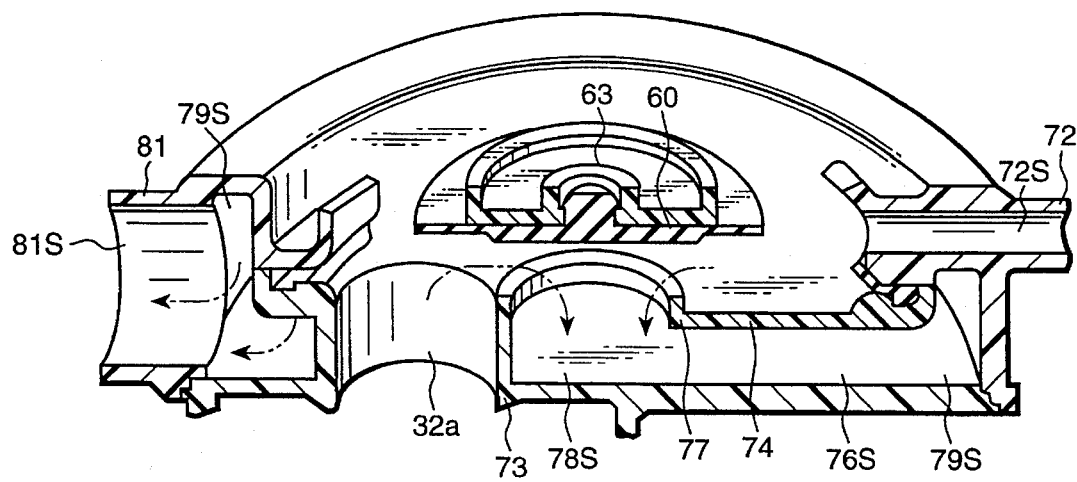
FIG. 9 is a broken, perspective view of a portion of the diaphragm valve.
Figure 8:
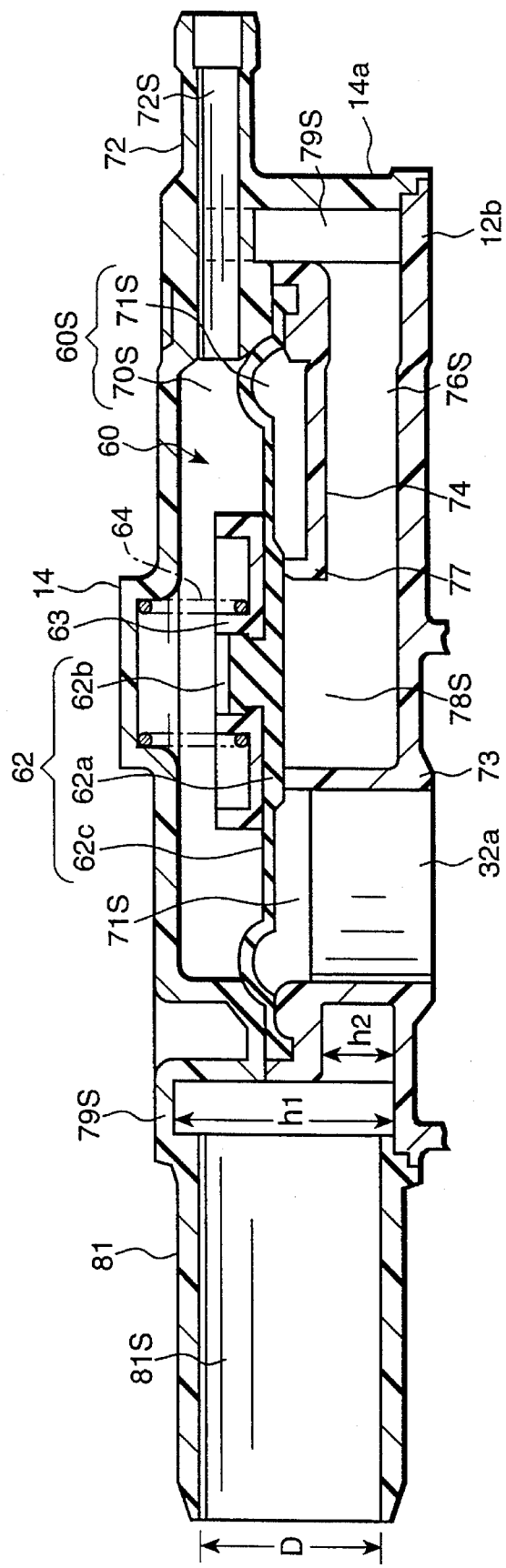
FIG. 8 is an enlarged, cross-sectional view of a diaphragm valve of the fuel tank device of the invention.
Figure 10:
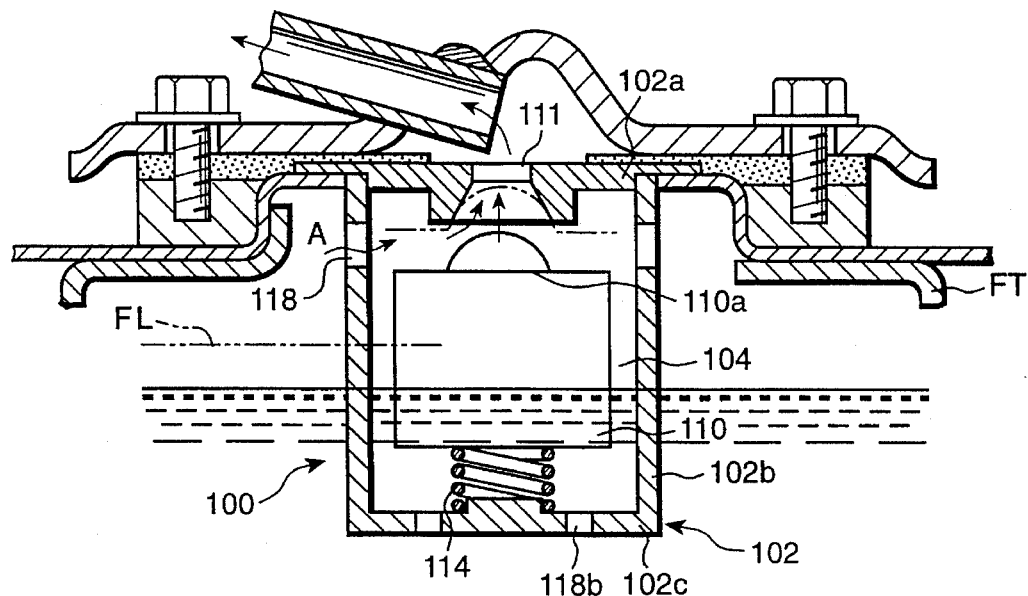
FIG. 10 is a cross-sectional view of a conventional float valve.
Figure 11:
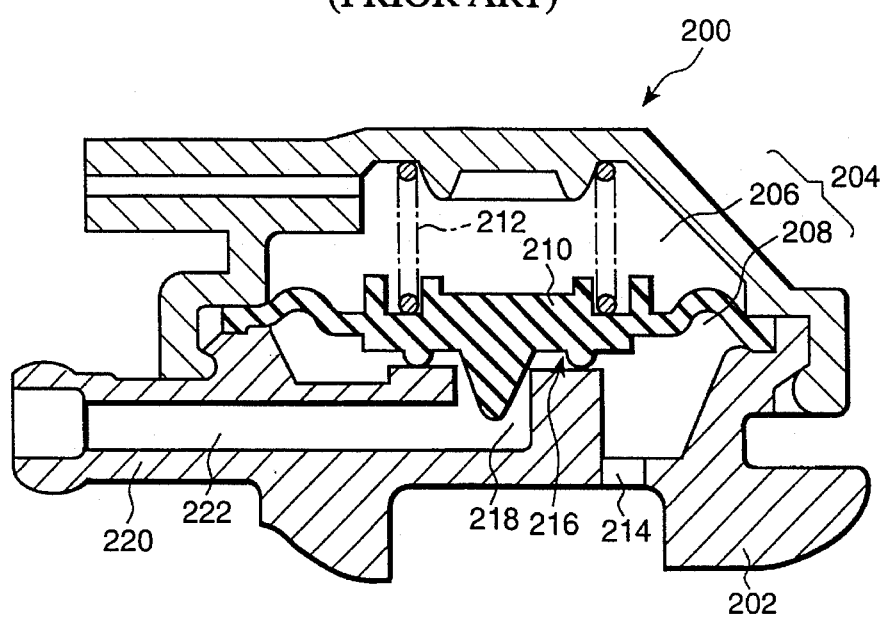
FIG. 11 is a cross-sectional view of a conventional diaphragm valve.

Next, the diaphragm valve 60 will now be described with reference to FIGS. 8 and 9. The diaphragm valve 60 is mounted within a diaphragm valve chamber 60S formed by the upper portion of the lower casing member 12 and the upper casing member 14. The diaphragm valve 60 comprises a diaphragm 62, a guide member 63 holding the diaphragm 62, and a coil spring 64.

The diaphragm 62 includes a flat plate-like closure portion 62a, a mounting projection portion 62b projecting from the closure portion 62a, and a pressure receiving portion 62c formed on and around an outer periphery of the closure portion 62a. The guide member 63 is mounted on the mounting projection portion 62b. The diaphragm valve chamber 60S is divided into a reference pressure chamber 70S and a fluid pressure chamber 71S by the diaphragm 62 which is held between the upper casing member 14 and an outer peripheral portion of a flange 12b of the lower casing member 12 at an outer peripheral portion of the pressure receiving portion 62c.

The reference pressure chamber 70S communicates with an outside air-introducing passage 72S formed in an outside air introducing conduit 72 which extends horizontally from the side of the upper casing member 14. Therefore, the pressure within the reference pressure chamber 70S is kept at the atmospheric pressure.

Formed below the fluid pressure chamber 71S is a vapor communication conduit 73 formed on and projected from the upper end of the lower casing member 12. This vapor communication conduit 73 defines the air outflow passage 32a formed at the upper end of the float valve 20. The air outflow passage 32a is connected at its upper end to the fluid pressure chamber 71S.

Provided below the fluid pressure chamber 71S is a disk-shaped discharge chamber 76S which is defined by a partition wall 74, the flange 12b of the lower casing member 12 and the outer peripheral wall of the upper casing member 14. An annular seat portion 77 is formed on an upper surface of the partition wall 74 at a central portion thereof, and the closure portion 62a of the diaphragm 62 is brought into and out of sealing engagement with the seat portion 77. Formed in the seat portion 77 is an outflow passage 78S which communicates the fluid pressure chamber 71S with the disk-shaped discharge chamber 76S when the diaphragm 62 is brought out of engagement with the seat portion 77.

An outer extension chamber 79S is connected to the outer periphery of the disk-shaped discharge chamber 76S. This outer extension chamber 79S is defined by a side wall 14a of the upper casing member 14 and the outer peripheral portion of the flange 12b of the lower casing member 12. The height h1 of the outer extension chamber 79S is greater than the height h2 of the disk-shaped discharge chamber 76S, and is generally equal to the thickness of the diaphragm valve 60.

A discharge conduit 81 extends from the side of the upper casing member 14, and a discharge passage 81S is formed in the discharge conduit 81. The discharge passage 81S has a circular transverse cross-section, and is connected to the outer extension chamber 79S. The inner diameter D of the discharge passage 81S is slightly smaller than the height h1 of the outer extension chamber 79S.

The operation of the diaphragm valve 60 will now be described. The pressure of the fuel vapor within the fuel tank FT is applied to the fluid pressure chamber 71S via the float valve 20 and the air outflow passage 32a. When this fuel vapor pressure becomes larger than the sum of the pressure within the reference pressure chamber 70S and the force of the coil spring 64, the diaphragm 62 is brought out of engagement with the seat portion 77 to open the outflow passage 78S. As a result, the air outflow passage 32a communicates with the discharge passage 81S via the fluid pressure chamber 71S, the outflow passage 78S, the disk-shaped discharge chamber 76S and the outer extension chamber 79S.

In such a construction, if the area of the flow passage from the flow passage 78S to the discharge passage 81S via the disk-shaped discharge chamber 76S and the outer extension chamber 79S is narrowed midway therethrough, a force tending to prevent the closing of the diaphragm valve 60 acts on the diaphragm 60, so that the opening and closing of the diaphragm 62 becomes unstable. This is undesirable.

Therefore, it is necessary to meet the requirement that the above flow passage area should not be narrowed, and also it is desirable that the flow passage area can be increased as much as possible and that the diaphragm valve 60 can be of a thin, compact construction. To achieve these requirements, the passage at the downstream side of the fluid pressure chamber 71s is defined by the thin, flat disk-shaped discharge chamber 76S. If a discharge passage, which corresponds to the discharge passage 81S but has an inner diameter generally equal to the height h2 of the thin, disk-shaped discharge chamber 76S, is merely connected to this discharge chamber 76S, a sufficient flow passage area of such a discharge passage can not be secured. In this embodiment, however, since the outer extension chamber 79S with the height h1 is provided around the outer periphery of the disk-shaped discharge chamber 76S, and is extended up to the upper side of the reference pressure chamber 70S, the discharge passage 81S having the increased inner diameter D can be connected to the disk-shaped discharge chamber 76S. With this construction and this passage arrangement, even if the inner diameter D of the discharge passage 81S is increased, the outer diameter of the discharge conduit 81 is generally equal to the thickness of the diaphragm valve 60, so that the diaphragm valve 60 of a compact construction can be obtained.

In the above embodiment, although the outer extension chamber 79S is provided around the entire outer periphery of the disk-shaped discharge chamber 76S, the outer extension chamber 79S, connected directly to the discharge passage 81S, may be of an arcuate configuration over a predetermined angle. In this respect, any suitable arrangement can be adopted in so far as the area of the flow passage between the disk-shaped discharge passage 76S and the discharge passage 81S is not narrowed.

In the above embodiment, although the diaphragm valve is operated by the atmospheric pressure, it may be operated by any other suitable reference pressure. For example, the diaphragm valve may be operated by a pressure of an intake manifold of an engine.

What is claimed is:

1. A fuel tank device for a vehicle having a fuel tank, said device comprising:

a float valve constructed and arranged to be mounted within the fuel tank at an upper portion of the fuel tank; and a diaphragm valve connected to an air outflow passage of said float valve, said float valve comprising (i) a casing defining a float chamber therein, said casing including a top wall with said air outflow passage disposed therethrough, a side wall extending downwardly from said top wall, and a bottom portion removably mounted on a lower end portion of said side wall, said bottom portion having a through hole, and (ii) a float received in said float chamber for vertical movement therein, said float having a valve portion for opening and closing said air outflow passage in accordance with a change of a fuel liquid level within the fuel tank, said diaphragm valve including (a) a reference pressure chamber constructed and arranged to be maintained at a predetermined pressure, (b) a fluid pressure chamber in communication with said air outflow chamber, (c) a fluid outflow passage provided at a generally central portion of said fluid pressure chamber, (d) a fluid discharge chamber in communication with said fluid outflow passage, (e) an annular outer extension chamber connected to an outer periphery of said fluid discharge chamber, said outer extension chamber having a height greater than a height of said fluid discharge chamber, (f) a fluid discharge passage connected to said outer extension chamber, said fluid discharge passage having an inner diameter generally equal to the height of said outer extension chamber, (g) a diaphragm separating said reference pressure chamber from said fluid pressure chamber, said diaphragm receiving a pressure of a fluid within said fluid pressure chamber for communicating said fluid pressure chamber with said fluid outflow passage, and (h) urging means for urging said diaphragm into a position to interrupt the communication between said fluid pressure chamber and said fluid outflow passage, wherein said bottom portion of said float valve includes an upstanding wall fitted in said side wall, and said through hole is formed through said upstanding wall, said through hole having a rectangular shape.

2. A fuel tank device according to claim 1, wherein a through hole is formed through said side wall of said float valve and is disposed in registry with said through hole formed through said upstanding wall.

3. A fuel tank device according to claim 1, wherein a plurality of first vertically-extending, elongate guide projections are formed on said side wall of said float valve, and a plurality of second vertically-extending, elongate guide projections are formed on a side wall of said float, and are engaged with said plurality of first elongate guide projections for guiding vertical movement of said float.

4. A fuel tank device according to claim 1, wherein said flat fluid discharge chamber has an arcuate configuration.

5. A float valve for a fuel tank comprising:

a casing defining a float chamber therein, said casing including a top wall having an air outflow passage therethrough, a side wall extending downwardly from said top wall, and a bottom portion removably mounted on a lower end portion of said side wall, said bottom portion having a through hole; and a float received in said float chamber for vertical movement therein, said float having a valve portion for opening and closing said air outflow passage in accordance with a change of a fuel liquid level within said fuel tank, wherein said bottom portion of said float valve has an upstanding wall fitted in said side wall, and said through hole is formed through said upstanding wall, said through hole having a rectangular shape.

6. A float valve according to claim 5, wherein a through hole is formed through said side wall of said float valve and is disposed in registry with said through hole formed through said upstanding wall.

7. A float valve for a fuel tank comprising:

a casing defining a float chamber therein, said casing including a top wall having an air outflow passage therethrough, a side wall extending downwardly from said top wall, and a bottom portion removably mounted on a lower end portion of said side wall, said bottom portion having a through hole; and a float received in said float chamber for vertical movement therein, said float having a valve portion for opening and closing said air outflow passage in accordance with a change of a fuel liquid level within said fuel tank, wherein a plurality of first vertically-extending, elongate guide projections are formed on said side wall of said float valve, and a plurality of second vertically-extending, elongate guide projections are formed on a side wall of said float and are engaged with said plurality of first elongate guide projections for guiding vertical movement of said float.

\* \* \* \* \*